(12) United States Patent
Dyson et al.

(10) Patent No.: US 6,354,635 B1
(45) Date of Patent: Mar. 12, 2002

(54) CUFF FOR JOINING AN INNER AND AN OUTER PIPE

(75) Inventors: James Dyson; Michael David Ganderton, both of Wiltshire (GB)

(73) Assignee: Notetry Limited, Wiltshire (GB)

( * ) Notice: Subject to any disclaimer, the term of this patent is extended or adjusted under 35 U.S.C. 154(b) by 0 days.

(21) Appl. No.: 09/509,870

(22) PCT Filed: Oct. 2, 1998

(86) PCT No.: PCT/GB98/02960

§ 371 Date: Jun. 23, 2000

§ 102(e) Date: Jun. 23, 2000

(87) PCT Pub. No.: WO99/17652

PCT Pub. Date: Apr. 15, 1999

(30) Foreign Application Priority Data

Oct. 3, 1997 (GB) ............................................. 9721066

(51) Int. Cl.[7] .................................................. A47L 9/24
(52) U.S. Cl. ........................................... 285/308; 285/7
(58) Field of Search .............................. 285/308, 305, 285/319, 309, 320, 7; 15/246.2

(56) References Cited

U.S. PATENT DOCUMENTS

| | | | |
|---|---|---|---|
| 2,444,888 A | * | 7/1948 | Baumgardner .................. 285/7 |
| 2,727,762 A | * | 12/1955 | Ziegler, Jr. ...................... 285/7 |
| 2,899,215 A | * | 8/1959 | Ardito ........................ 15/246.2 |
| 4,577,877 A | | 3/1986 | Berg et al. |
| 4,700,926 A | | 10/1987 | Hansen |
| 4,863,201 A | | 9/1989 | Carstens |
| 5,090,747 A | | 2/1992 | Kotake |
| 5,201,552 A | * | 4/1993 | Hohmann et al. ....... 285/308 X |
| 5,374,088 A | * | 12/1994 | Moretti et al. ............... 285/305 |
| 5,447,343 A | | 9/1995 | Gajewski et al. |
| 5,452,924 A | * | 9/1995 | Kujawski .................... 285/305 |
| 6,142,537 A | * | 11/2000 | Shimada et al. ............. 285/308 |
| 6,231,089 B1 | * | 5/2001 | DeCler et al. ............... 285/308 |

FOREIGN PATENT DOCUMENTS

| | | |
|---|---|---|
| DE | 39 16 531 C1 | 5/1990 |
| DE | 38 42 237 A1 | 6/1990 |
| DE | 39 29 399 A1 | 3/1991 |
| WO | WO 94/10494 | 5/1994 |

OTHER PUBLICATIONS

International Search Report.

* cited by examiner

*Primary Examiner*—Lynne H. Browne
*Assistant Examiner*—David E. Bochna
(74) *Attorney, Agent, or Firm*—Morrison & Foerster LLP

(57) ABSTRACT

A cuff (10) for joining together an inner and outer pipe (16, 14), the cuff being slideable along at least part of the inner pipe to allow nesting of the pipes. The cuff (10) comprises a housing (12) and an interlocking member (28). The interlocking member (28) lies, in use, in a plane extending transversely to the longitudinal axis of the pipes. The interlocking member has an actuator and an interengaging portion for interengaging with the inner pipe (16). In use, the interengaging portion lies on the side of inner pipe (16) remote from the actuator portion (30) so that, when the interlocking member (28) is translated within the plane on actuation, the interengaging portion is released from the inner pipe. A pair of diametrically opposed lugs (not shown) are located on the interlocking member (28) and a compression spring (not shown) acts between each lug and the housing (12) so as to bias the interengaging portion into engagement with the inner pipe.

12 Claims, 5 Drawing Sheets

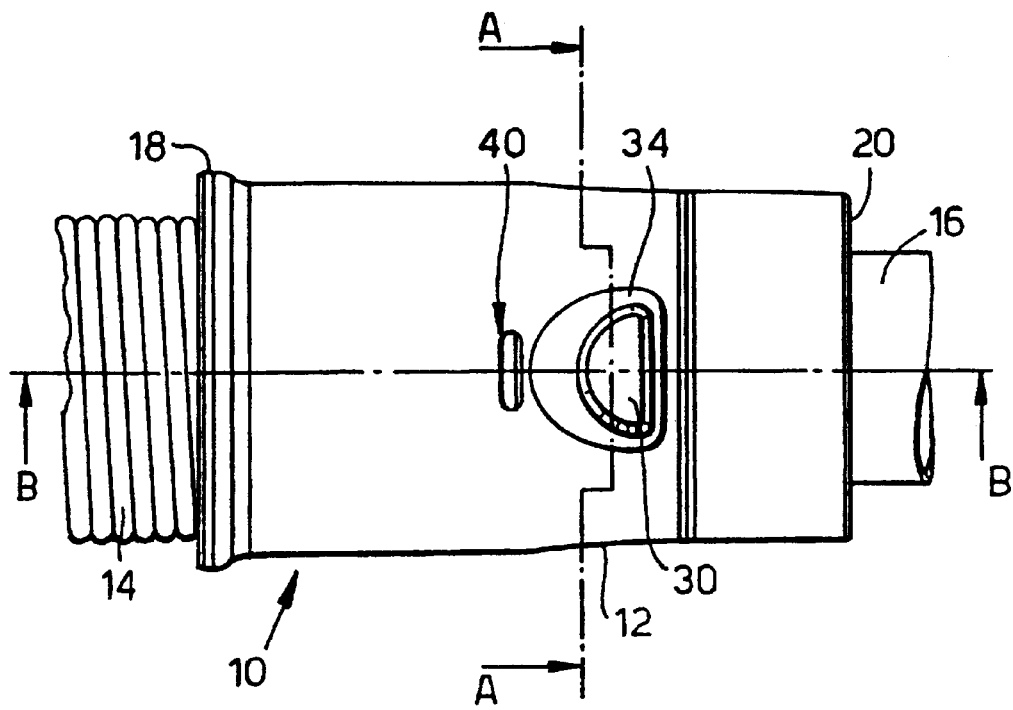
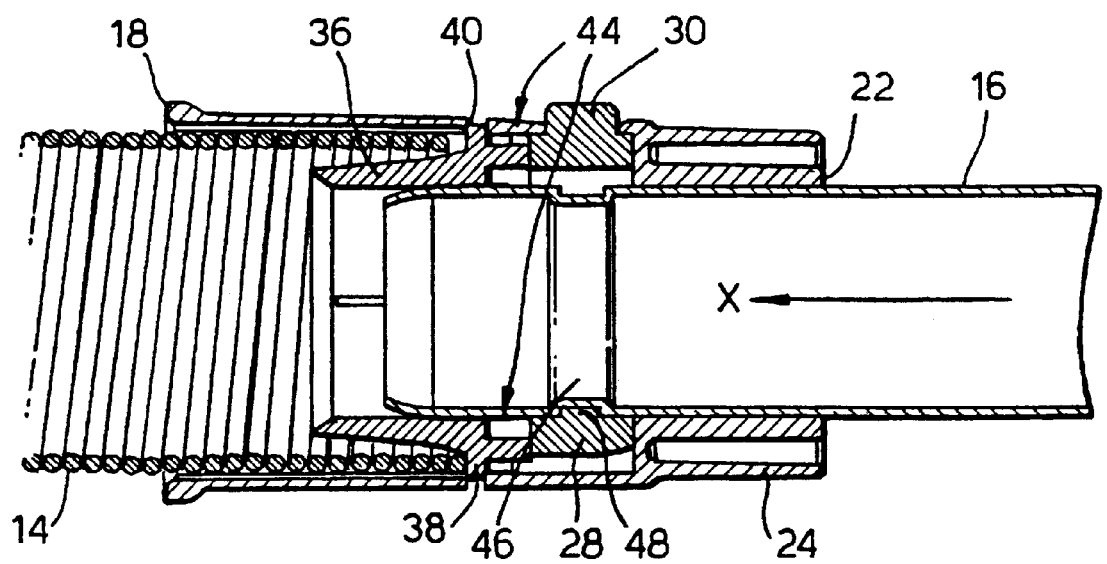

CUFF FOR JOINING AN INNER AND AN OUTER PIPE

FIELD OF THE INVENTION

The present invention relates to a cuff for joining together pipes. Particularly, but not exclusively, it relates to a cuff for joining together two pipes in which the cuff is slideable along at least part of one of the pipes to allow nesting of the pipes.

It is understood that the term "pipe" referred to throughout the specification includes a rigid pipe or a flexible pipe (hose).

BACKGROUND OF THE INVENTION

Cuffs of the types referred to above are known for joining the flexible hose portion and the rigid pipe portion of a wand of a vacuum cleaner 1 as shown in FIG. 1. The cuff 10 is attached to one end of the flexible, extendable hose portion 14 of the wand 3. The cuff 10 is slideable along the rigid pipe portion 16 so that the rigid pipe portion 16 nests within the flexible hose portion 14 for storage but can be fully extended when in use. In the stored position, the cuff is slid to the uppermost end of the rigid pipe portion 16, the flexible hose portion 14 rests over the rigid pipe portion 16 and the assembly is then clipped onto the body 5 of the vacuum cleaner with the nozzle 7 of the wand 3 uppermost. The nozzle 7 then forms a handle for manoeuvring the vacuum cleaner over a surface to be cleaned. For above-floor cleaning the wand 3 is unclipped from the body 5 of the vacuum cleaner and the cuff 10 is slid to the lowermost end of the rigid pipe portion 16 so that the wand 3 is fully extended as shown in FIG. 1. The wand 3 can then be used to clean awkward areas. The flexible pipe portion 14 is extendable giving the user full flexibility.

This type of cuff provides a partial seal between the flexible hose portion and the rigid pipe portion so that the air flow path defined by the flexible hose, cuff and rigid pipe portion is continuous but not fully airtight. This can cause loss of suction. The cuff also ensures that the rigid pipe portion and the flexible hose portion are not detached from each other. However, the cuff does not hold the rigid pipe portion with respect to the flexible pipe portion and therefore the cuff can slide along the rigid hose portion during use. This causes the end of the rigid pipe portion to project into the flexible pipe portion which, since the flexible pipe portion will normally follow a curved path, in use, the rigid pipe portion contacts the inner wall of the flexible pipe portion causing wear at the point of contact. At the lowermost end of the rigid pipe portion, there is provided means for preventing it from completely falling out of the cuff. Therefore, for above-floor cleaning tools must be attached to the remote end of the rigid pipe portion. Since the rigid pipe portion is inflexible, it can be awkward for cleaning particularly confined spaces.

Another type of known cuff provides means for retaining two or more rigid pipe portions in predetermined positions with respect to each other. Examples are shown and described in WO 94/10494, U.S. Pat. No. 5,090,747 and U.S. Pat. No. 4,863,201. However, such cuffs are generally bulky and are therefore unsuitable for use in situations in which space and weight are at a premium as in the case, for example, of a vacuum cleaner wand of the type shown in FIG. 1, particularly a domestic vacuum cleaner.

SUMMARY OF THE INVENTION

The present invention seeks to provide a cuff for joining together two pipes which can retain the pipes at a predetermined position with respect to each other and which is also compact. The present invention also seeks to provide a cuff for joining together two pipes and which is suitable for use in a wand for a vacuum cleaner, particularly a domestic vacuum cleaner.

According to the present invention, there is provided a cuff for joining together an inner pipe and an outer pipe, the cuff being slideable along at least part of the inner pipe to allow nesting of the pipes, the cuff comprising a housing and an interlocking member supported by the housing, the interlocking member lying, in use, around the inner pipe in a plane extending transversely to the longitudinal axis of the inner and outer pipes, and having an actuator portion and an interengaging portion for interengaging with the inner pipe, the interengaging portion lying, in use, on the side of the inner pipe remote from the actuator portion so that, when the interlocking member is translated within the plane on actuation, the interengaging portion is released from the inner pipe, characterised in that a pair of diametrically opposed lugs are located on the interlocking member and in that a compression spring acts between each lug and the housing so as to bias the interengaging portion into engagement with the inner pipe.

The interlocking member of the cuff according to the present invention provides means for retaining the cuff at a predetermined position with respect to the inner pipe, thus preventing slippage of the inner pipe when in use and minimising wear. Further, the release of the interengaging portion from the inner pipe by translation of the interlocking member in the plane, which extends transversely to the longitudinal axis of the pipes, provides a more compact cuff which is more suitable for storage where space is minimal. Furthermore the interlocking member generally follows the shape of the pipes to minimise the size of the cuff. The outer edge of the interlocking member and the housing of the cuff are preferably circular or substantially circular so as to conform to the shape of the inner and outer pipes to further minimise the size of the cuff.

In providing two compression springs, the bias required to maintain engagement of the tongue and groove is shared. Therefore, the size of the springs can be further reduced and hence also the size of the cuff housing. The cuff enables the inner pipe to be completely released from the cuff so that tools can be inserted directly and held in place by the interlocking member.

Preferably, the interengaging portion interengages the inner pipe by a tongue and groove arrangement. In alternative arrangements, the interengaging portion comprises one or two tongues which interengage at least one groove in the inner pipe, or the interengaging portion comprises one or two grooves which interengage a corresponding tongue on the inner pipe.

Preferably, the actuator portion comprises a push-button which, when pressed, counteracts the bias of the compression springs to release the interengaging portion from its engagement with the inner pipe.

In a preferred embodiment, the interengaging portion comprises a substantially annular ring and the actuator portion is located on the annular ring diametrically opposite the interengaging portion and perpendicular to that joining the lugs.

In a preferred embodiment, the cuff further comprises a second interlocking member lying in a plane extending transversely to the longitudinal axis of the inner and outer pipes, and having a second actuator portion and a second interengaging portion for interengaging with the inner pipe, the second interengaging portion lies on the side of the inner pipe remote from the second actuator portion so that, the second interlocking member is translated within the plane on actuation in a direction opposite to the translation of the first interlocking member to release the second interengaging portion from the inner pipe.

Preferably, the cuff comprises a seal for sealing the housing and the interlocking member with the inner pipe. Therefore, an improved seal is achieved which provides improved suction when the cuff forms part of a vacuum cleaner.

The cuff of the present invention is particularly suitable for joining the inner and outer pipes of a wand for a vacuum cleaner where the inner pipe is a rigid pipe and the outer pipe is a flexible pipe.

In the case of use in a wand for a vacuum cleaner therefore, tools can be attached to the flexible hose for above-floor cleaning making the cleaner easier to use in particularly awkward places.

BRIEF DESCRIPTION OF THE DRAWINGS

A embodiment of the present invention will now be described with reference to the accompanying drawings, in which:

FIG. 3 is a front view of the cuff of FIG. 2;

FIG. 5 is a section taken along the line B—B of the cuff of FIG. 3 in the locked position;

DETAILED DESCRIPTION OF THE INVENTION

Figure 1:
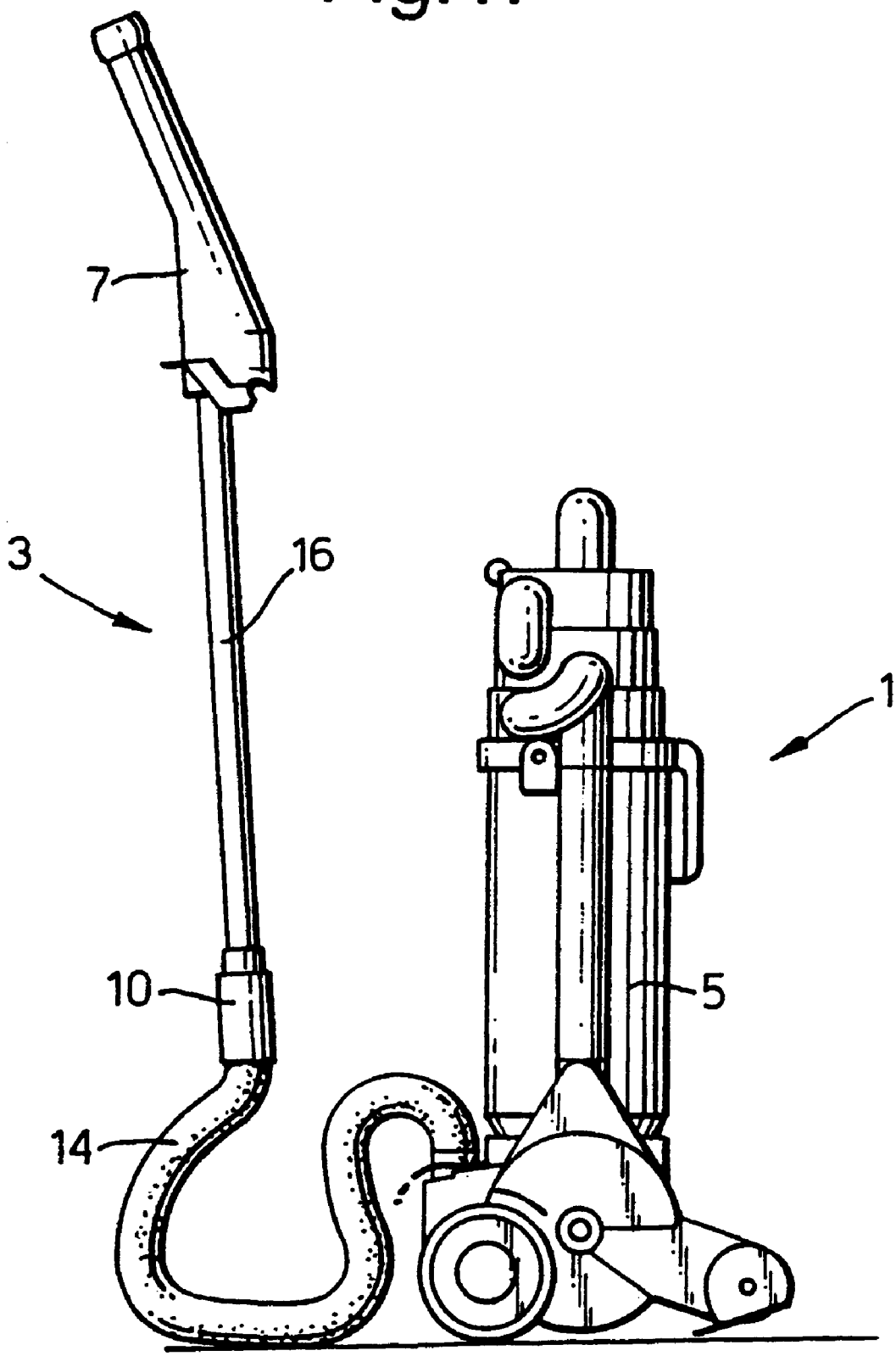
FIG. 1 shows a known vacuum cleaner having a wand which incorporates a cuff.
Figure 2:
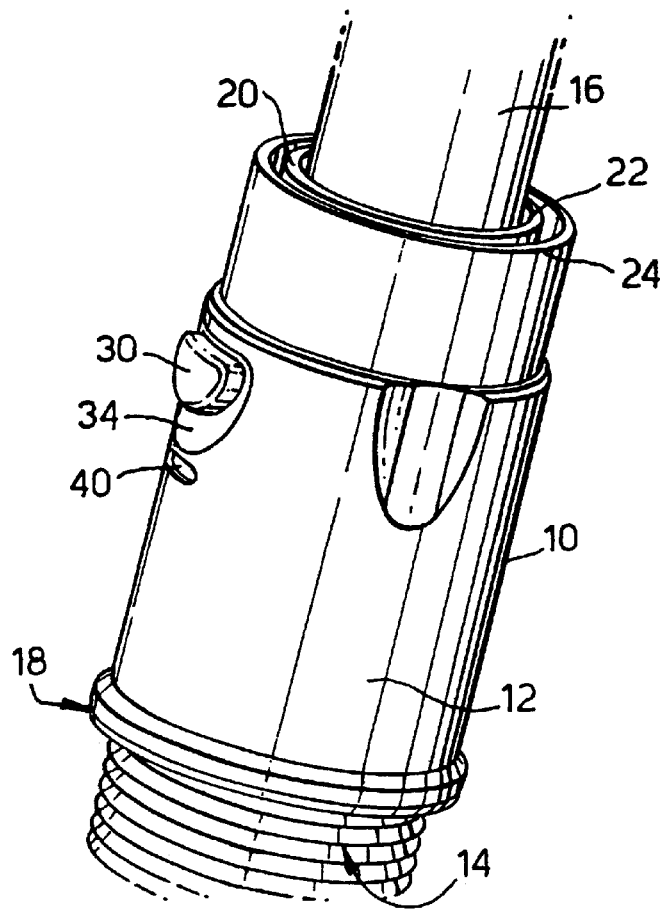
FIG. 2 is a perspective view of a cuff according to the present invention.
Figure 4:
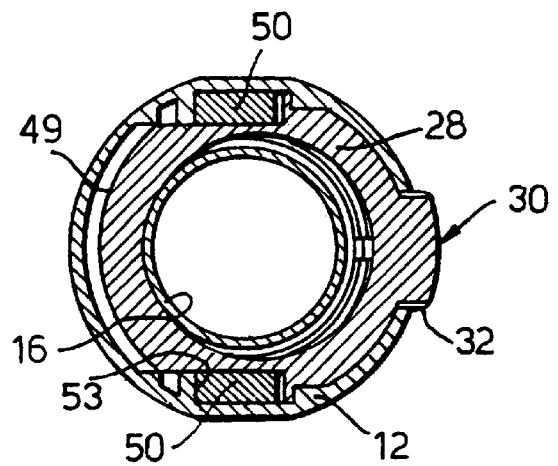
FIG. 4 is a section taken along the line A—A of the cuff of FIG. 3 in the locked position.

A cuff according to the present invention is shown in FIGS. 2 to 8 of the drawings. The cuff is described with reference to its use in a wand for a vacuum cleaner. Of course, the cuff may be used in different applications.

The cuff 10 has a generally cylindrical housing 12. One end of a flexible hose 14 is inserted into one end of the housing 12 and fixedly held therein by, for example, gluing or welding. One end of a rigid pipe 16 is slidingly inserted into the other end of the housing 12 so that the cuff joins the flexible hose 14 and rigid pipe 16 together to form a continuous air flow path. The direction of air flow is indicated by the arrow X shown in FIG. 5. The cuff 10 is slideable along part of the rigid pipe 16 so that the rigid pipe 16 can nest inside the flexible hose 14.

The end of the housing 12 extending over the flexible hose 14 terminates with a bell shaped mouth 18 which helps to reduce wear on the flexible hose 14. The flexible hose preferably has a stretch ratio of 6.25:1. The mouth 20 at the other end of the housing 12 fitted around the rigid pipe 16 has a reduced inner diameter which corresponds to the outer diameter of the rigid pipe 16. The mouth 20 is formed from two concentric cylindrical walls, an inner wall 22 and an outer wall 24. The inner wall 22 and the outer wall 24 are joined by a base or seat 26, at the end thereof remote from the mouth 20.

An interlocking member 28 is fitted within the housing 12 to rest on the seat 26. The interlocking member 28 comprises an actuator portion 30 which is a push-button. The actuator portion 30 projects through a hole 32 in the housing 12. The area surrounding the hole 32 of the housing is flattened to form a generally triangular depression 34. The interlocking member 28 is held in place by a guide member 36 which is snap fitted into the housing 12 by means of a pair of diametrically opposing projections 38 which engage with corresponding holes 40 in the housing. The guide member 36 abuts against the lower edge of the interlocking member 28 preventing the interlocking member 28 from moving in the direction of the longitudinal axis of the housing 12. The inner dimension of the guide member 36 corresponds to that of the rigid pipe 16.

The flexible hose 14 is bonded to the outer surfaces of the guide member 36 with adhesive. This provides an excellent seal between the flexible hose 14 and the cuff 10. This seal is further improved by the fact that the guide member 36 is profiled to match exactly the helical form of the flexible hose 14. The guide member 36 and the bonded hose 14 are inserted into the bell shaped mouth 18 of the housing 12 of the cuff 10 and snap-fitted into the holes 40 in the housing 12 by holding the interlocking member 28 in the correct position.

To form an airtight seal between the components of the cuff 10, nylon lip seals 44 are provided between the guide member 36 and the housing 12 and between the guide member 36 and the rigid pipe 16.

The rigid pipe 16 has an annular groove 46. In the drawings, one groove is shown but any number of grooves can be provided at predetermined positions along the length of the rigid pipe 16. The groove 46 is located towards one end of the rigid pipe remote from the other which is adapted to receive dirty air during use. The interlocking member 28 farther comprises a tongue 48 which extends radially inwards diametrically opposite the push-button 30. The tongue 48 engages with the annular groove 46 of the rigid pipe 16 in the locked position as shown in FIG. 5 when the rigid pipe is fully extended ready for use and is held in that position, thus preventing any further movement between the rigid pipe 16 and the flexible hose 14. Wear due to relative movement of this sort is thereby eliminated.

The interlocking member 28 extends in the plane perpendicular to the longitudinal axis of the rigid pipe 16, the flexible hose 14 and the cuff 10 to form an annular zing 49 around the rigid pipe 16. The inner diameter of the ring 49 is greater than the diameter of the rigid pipe 16 to allow translation in that plane. Alternatively, the interlocking member can have a central aperture which is slightly elliptical or oval, as opposed to circular. The tongue 48 is biased to engage the annular groove 46 of the rigid pipe 16 by means of a pair of diametrically opposite compression springs 50 acting on lugs 53 positioned at either end of a diameter of the interlocking member lying at right angles to that joining of the push-button 30 and the tongue 48. The compression springs 50 rest above the guide member 36 in recesses 51 formed in the wall of the housing 12 and act against the ends of those recesses.

Figure 6:
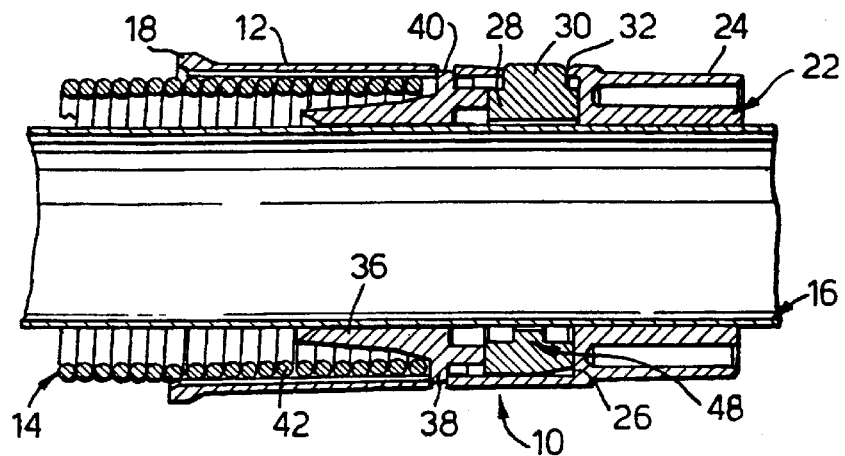
FIG. 6 is a section taken along the line B—B of the cuff of FIG. 3 in the unlocked position.
Figure 7:
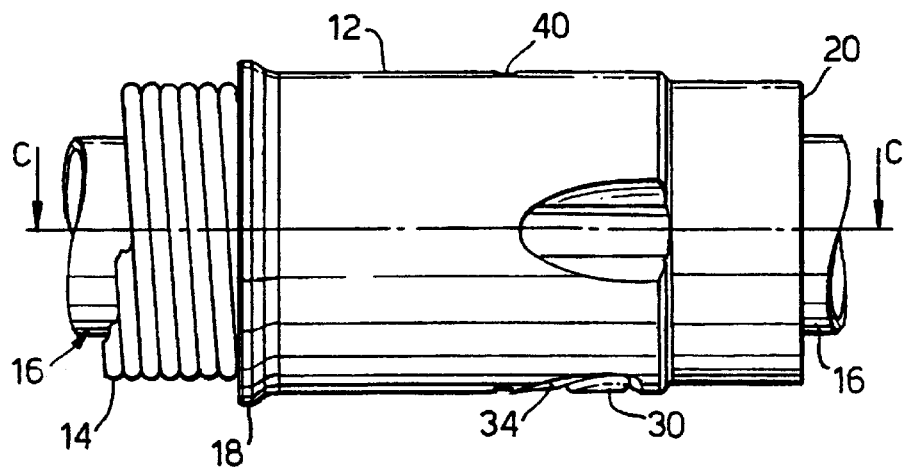
FIG. 7 is a side view of the cuff according to the present invention.
Figure 8:
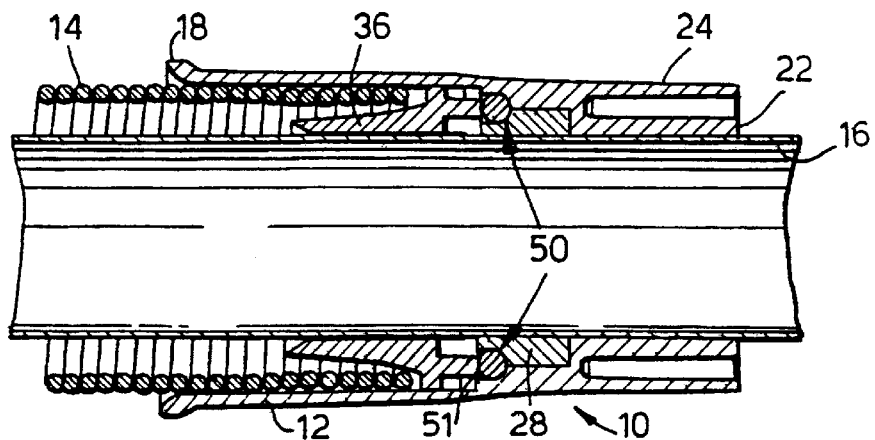
FIG. 8 is a section taken along the line C—C of the cuff of FIG. 7.

To release the tongue 48 from the groove 46, the push-button 30 is pressed radially inwardly against the bias of the compression springs 50 so that the interlocking member 28 translates in the plane perpendicular to the longitudinal axis of the flexible hose 14 and rigid pipe 16 by a distance of approximately 1.75 mm until the tongue 48 is clear of the groove 46. The rigid pipe 16 can then slide with respect to the cuff 10 as shown in FIG. 6. The interlocking member 28 remains in this unlocked position until the tongue 48 engages a groove in the rigid pipe 16.

Figure 9:
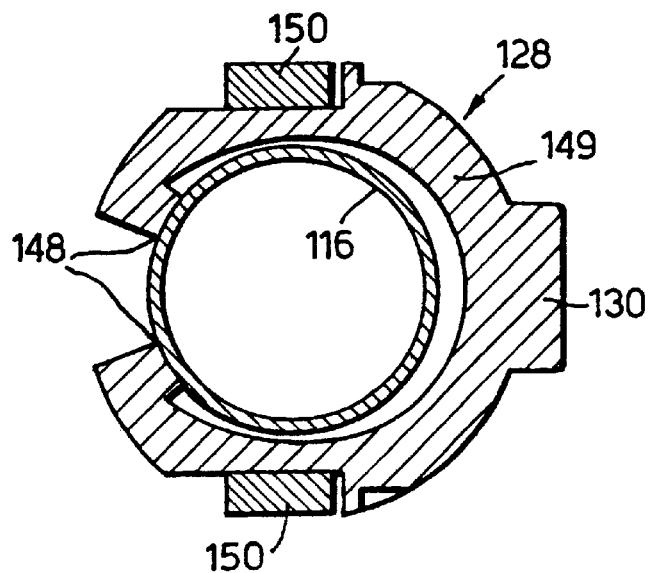
FIG. 9 shows a first alternative arrangement of the interlocking member of the cuff according to the present invention.

FIG. 9 shows an alternative arrangement of the interlocking member of the present invention. The other common components of the cuff as shown in FIGS. 2 to 8 have been omitted here for simplicity. The interlocking member 128 comprises a push-button 130 and an arcuate member 149. The arcuate member 149 extends partly around the inner, rigid pipe 116 in a plane extending transversely to the longitudinal axis of the pipe. The push-button 130 is located at the midpoint of the arcuate member 149 so as to protrude from the housing as in the embodiment described above. A tongue 148 is located at each end of the arcuate member 149. The tongues 148 extend inwardly to interengage with the rigid pipe 116 on the side of the pipe remote from the push-button 130. As in the embodiment described above, the tongues 148 engage with at least one annular groove (not shown) in the inner pipe 116. A pair of compression springs 150 are provided to act on the arcuate member 149 to bias the tongues 149 into the groove. The springs 150 are located diametrically opposite each other on either side of the push-button 130 as before.

Figure 10:
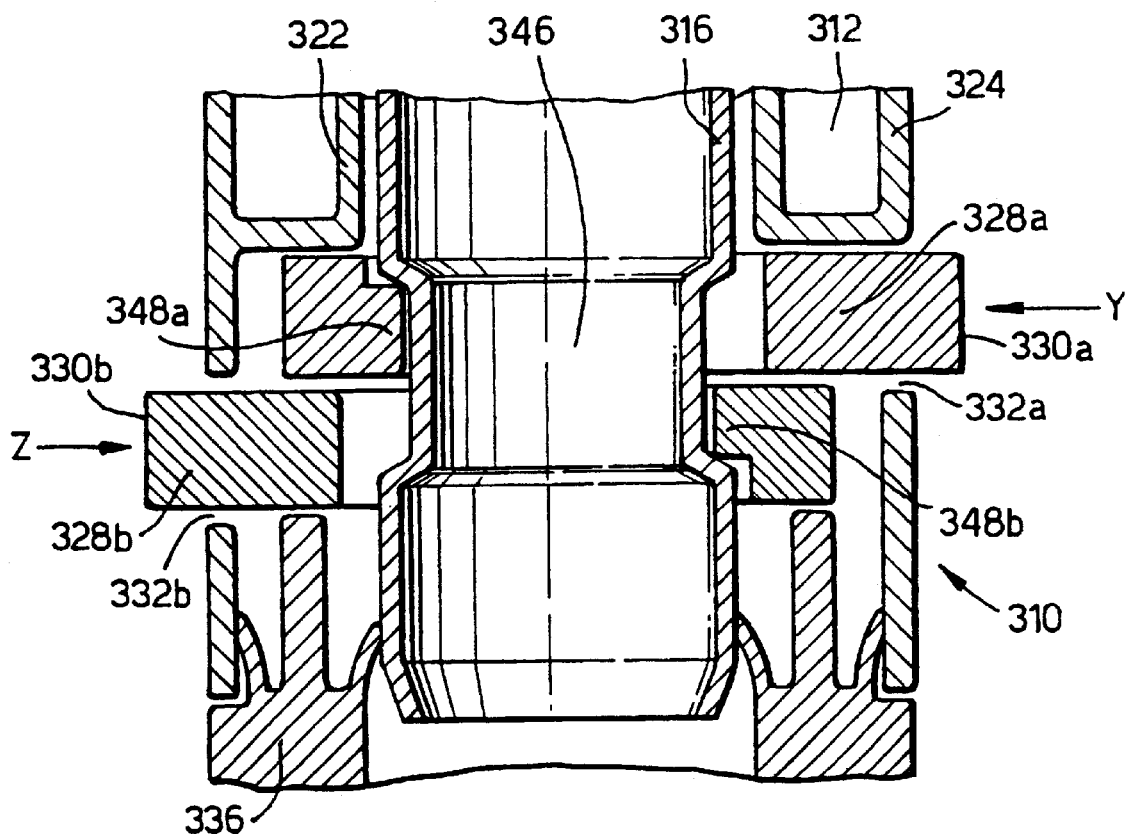
FIG. 10 shows a second alternative arrangement of the interlocking member of the cuff according to the present invention.

FIG. 10 shows another alternative arrangement of the interlocking member of the present invention. The other common components of the cuff as shown in FIGS. 2 to 8 have been omitted here for simplicity.

The interlocking member 328a, 328b comprises a pair of members, a first interlocking member 328a and a second interlocking member 328b. Each member is similar to the interlocking member 28 described with reference to FIGS. 2 to 8. This arrangement could also be realised with the interlocking member described with reference to FIG. 9.

The first interlocking member 328a rests on a seat 326 formed by an inner wall 322 and an outer wall 324 of the housing 312 of the cuff 310 as described above with reference to FIGS. 2 to 8. The second interlocking member 328b rests against the first interlocking member 328a and a guide member 336. The guide member 336 corresponds to that described above with reference to FIGS. 2 to 8. A flexible hose (not shown) is attached to the housing as described above with reference to FIGS. 2 to 8.

Each interlocking member 328a, 328b comprises a push-button 330a, 330b. Each push-button 330a, 330b projects through a hole 332a and 332b in the housing 312. Each hole 332a and 332b are located diametrically opposite each other and displaced in the direction of the longitudinal axis of the housing 312 so that the push-buttons 330a, 330b of the first and second interlocking member 328a, 328b are diametrically opposite and project through their respective holes 332a, 332b.

Each interlocking member 328a, 328b also comprises a tongue 348a, 348b which extends radially inwards diametrically opposite its respective push-button 330a, 330b. Each tongue 348a, 348b engages an annular groove 346 formed in a rigid pipe 316. In the drawing, one groove is shown but any number of grooves can be provided at predetermined positions along the length of the rigid pipe 316. The groove 346 is located towards one end of the rigid pipe remote from the other which is adapted to receive dirty air during use.

Each tongue 348a, 348b is formed on the inner side of the first and second interlocking member 328a, 328b which rest against each other so that each tongue 348a, 348b simultaneously engages the same groove 346.

To release the tongue and groove arrangement both push-buttons 330a, 330b of the first and second interlocking members 328a, 328b are pushed radially inwards, as indicated by the arrows Y and Z, at the same time, to counteract the bias of the compression springs (not shown). In this way the two interlocking members 328a, 328b share the compression springs. Pressing the push-buttons 330a, 330b causes each interlocking member 328a, 328b to move in the plane perpendicular to the longitudinal axis of the housing 312 of the cuff 310 in opposing directions until each tongue 348a, 348b is clear of the groove 346. The rigid pipe 316 can then slide with respect to the cuff 310.

The tongue and groove arrangement described, with reference to FIGS. 2 to 10 can be interchanged so that the tongue is either part of the interlocking member 28,128, 328a,328b or is located on the inner pipe 16,116,316 and the groove is either located on the inner pipe 16,116,316 or on the interlocking member 28,128,328a,328b.

In the preferred embodiments described above, the cuff joins a flexible hose to a rigid pipe. The cuff slides along the rigid pipe so that the rigid pipe and flexible hose are nested which is particularly useful for use in a wand of a vacuum cleaner as shown in FIG. 1. Further, the rigid pipe can be removed from the cuff and tools can be attached to the flexible hose via the cuff. The vacuum cleaner 1 is preferably of the type containing a cyclonic separator.

In the light of this disclosure, modifications of the described embodiments as well as other embodiments, all within the scope of the appended claims, will now become apparent to persons skilled in the art.

What is claimed is:

1. A cuff for joining together an inner pipe and an outer pipe, the cuff being slideable along at least part of the inner pipe to allow nesting of the pipes, the cuff comprising a housing and an interlocking member supported by the housing, the interlocking member being capable of lying around the inner pipe in a plane extending transversely to a longitudinal axis of the inner and outer pipes and having an actuator portion and an interengaging portion for interengaging with the inner pipe, the interengaging portion being capable of lying on the side of the inner pipe remote from the actuator portion so that, when the interlocking member is translated within the plane on actuation, the interengaging portion is released from the inner pipe, wherein a pair of diametrically opposed lugs are provided on the interlocking member and a spring is provided to engage between each lug and the housing so as to bias the interengaging portion into engagement with the inner pipe, the diametrically opposed lugs being located substantially mid-way, in the direction of translation, between the actuator portion and the interengaging portion.

2. A cuff according to claim 1, wherein the interengaging portion is capable of interengaging the inner pipe by a tongue and groove arrangement.

3. A cuff according to claim 2, wherein the interengaging portion comprises an inwardly extending tongue for interengaging at least one groove in the inner pipe.

4. A cuff according to claim 3, wherein the interengaging portion comprises a second inwardly extending tongue for interengaging at least one groove in the inner pipe.

5. A cuff according to claim 1, wherein the actuator portion comprises a push-button capable of counteracting the bias of the compression springs to release engagement of the interengaging portion.

6. A cuff according to claim 1, wherein the interengaging portion comprises a substantially annular ring.

7. A cuff according to claim 6, wherein the actuator portion is provided on the annular ring diametrically opposite the interengaging portion on a diameter perpendicular to the diameter joining the lugs.

8. A cuff according to claim 1, further comprising a second interlocking member capable of lying in a plane extending transversely to the longitudinal axis of the inner pipe and the outer pipe, and having a second actuator portion and a second interengaging portion for interengaging with the inner pipe, the second interengaging portion being capable of lying on the side of the inner pipe remote from the second actuator portion so that the second interlocking member is translated within the plane on actuation in a direction opposite to the translation of the first interlocking member to release the second interengaging portion from the inner pipe.

9. A cuff according to claim 1, further comprising a seal for sealing the housing and interlocking member with the inner pipe.

10. A wand for a vacuum cleaner comprising an inner pipe, and outer pipe, and a cuff according to claim 1, the cuff joining the inner and outer pipes together.

11. A wand according to claim 10, wherein the inner pipe comprises a rigid pipe and the outer pipe comprises a flexible pipe.

12. A vacuum cleaner comprising the wand according to claim 10 or 11.

* * * * *